US011513819B2

(12) United States Patent
Verma et al.

(10) Patent No.: US 11,513,819 B2
(45) Date of Patent: Nov. 29, 2022

(54) MACHINE LEARNING BASED IMPACT ANALYSIS IN A NEXT-RELEASE QUALITY ASSURANCE ENVIRONMENT

(71) Applicant: Bank of America Corporation, Charlotte, NC (US)

(72) Inventors: Sandeep Verma, Haryana (IN); Pavan Chayanam, Alamo, CA (US); Srinivas Dundigalla, Charlotte, NC (US); Mohan Kakarla, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 205 days.

(21) Appl. No.: 16/922,300

(22) Filed: Jul. 7, 2020

(65) Prior Publication Data

US 2022/0012069 A1  Jan. 13, 2022

(51) Int. Cl.
*G06N 20/00* (2019.01)
*G06K 9/62* (2022.01)
*G06F 9/451* (2018.01)
*G06F 8/71* (2018.01)
*G06F 40/30* (2020.01)
(Continued)

(52) U.S. Cl.
CPC .......... *G06F 9/451* (2018.02); *G06F 3/04817* (2013.01); *G06F 8/71* (2013.01); *G06F 11/3664* (2013.01); *G06F 40/30* (2020.01); *G06K 9/6256* (2013.01); *G06N 20/00* (2019.01)

(58) Field of Classification Search
CPC ........ G06F 9/451; G06F 3/04817; G06F 8/71; G06F 11/3664; G06F 40/30; G06F 40/20; G06K 9/6256; G06N 20/00
See application file for complete search history.

(56) References Cited

U.S. PATENT DOCUMENTS 7,480,900 B1 * 1/2009 Zhou ................... G06F 11/3676
714/38.1
8,516,308 B1   8/2013 Gill et al.
(Continued)

OTHER PUBLICATIONS

Chan et al. (SeeSS: Seeing What I Broke—Visualizing Change Impact of Cascading Style Sheets (CSS), published Oct. 2013, pp. 353-356) (Year: 2013).*

*Primary Examiner* — Stephen S Hong
*Assistant Examiner* — Ahamed I Nazar
(74) *Attorney, Agent, or Firm* — Banner & Witcoff, Ltd.

(57) ABSTRACT

Aspects of the disclosure relate to impact analysis in a next-release quality assurance environment for a software application. First log data associated with user navigation of user interface components in a production environment may be retrieved. A production navigational graph may be generated, where a node represents a user interface component visited by a user, and an edge representing a navigational link traversed by the user. Then, second log data associated with release notes for a next-release version of the software application maybe retrieved. Then, the computing platform may identify a change in a portion of a software code in the next-release version, and may identify, based on the production navigational graph, a user interface component and/or a link potentially impacted by the change. The production navigational graph may be provided, via an interactive graphical user interface, where the user interface component and/or the link is visually highlighted.

20 Claims, 5 Drawing Sheets

(51) Int. Cl.
*G06F 3/04817* (2022.01)
*G06F 11/36* (2006.01)

(56) References Cited

U.S. PATENT DOCUMENTS

| | | |
|---|---|---|
| 9,389,988 B1 * | 7/2016 | Cohen ........................ G06F 8/30 |
| 9,519,869 B2 | 12/2016 | Hwang |
| 10,013,334 B1 | 7/2018 | Carey et al. |
| 2010/0088546 A1 | 4/2010 | Chilimbi et al. |
| 2012/0324423 A1 * | 12/2012 | Khan ........................ G06F 8/34 |
| | | 717/109 |
| 2015/0269278 A1 * | 9/2015 | Bhattacharyya .... G06F 16/9024 |
| | | 707/798 |
| 2018/0330248 A1 * | 11/2018 | Burhanuddin ......... G06N 20/00 |
| 2021/0192321 A1 * | 6/2021 | Zhang ................. G06N 3/0445 |

* cited by examiner

MACHINE LEARNING BASED IMPACT ANALYSIS IN A NEXT-RELEASE QUALITY ASSURANCE ENVIRONMENT

BACKGROUND

Aspects of the disclosure relate to deploying digital data processing systems to manage a performance of a software application. In particular, one or more aspects of the disclosure relate to machine learning based impact analysis in a next-release quality assurance environment.

Enterprise organizations may utilize various software applications to support their computing infrastructure. Performance such software applications may undergo changes based on modifications to an underlying source code, user interface components, and/or navigational links. In some instances, software applications may be modified for a new release and/or upgrade. Ensuring that performance related issues for the software application are properly identified, and timely and targeted error correction steps are performed to ensure a smooth running of the software application in a production environment, and minimize an impact of the modifications to the source code, user interface components, and/or navigational links, to enterprise services, may be highly advantageous to maintain an efficient and stable computing infrastructure. In many instances, however, it may be difficult to perform upgrades with speed and accuracy while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with impact analysis in a next-release quality assurance environment.

In accordance with one or more embodiments, a computing platform having at least one processor, and memory storing computer-readable instructions that, when executed by the at least one processor, cause the computing platform to retrieve, by a computing device and for a software application, first log data associated with user navigation of one or more user interface components in a production environment. Subsequently, the computing platform may generate, by the computing device and based on the first log data, a production navigational graph for the software application, wherein a node of the production navigational graph represents a user interface component visited by a user, and an edge between two nodes represents a navigational link traversed by the user. Then, the computing platform may retrieve, by the computing device and for the software application, second log data associated with release notes for a next-release version of the software application. Then, the computing platform may identify, by the computing device and based on the second log data, a change in a portion of a software code in the next-release version. Subsequently, the computing platform may identify, by the computing device and based on the production navigational graph, one or more of: a user interface component potentially impacted by the change, and a link potentially impacted by the change. Then, the computing platform may provide, via an interactive graphical user interface, the production navigational graph, wherein the one or more of the user interface component potentially impacted by the change and the link potentially impacted by the change are visually highlighted.

In some embodiments, the computing platform may identify a user interface component or a link potentially impacted by the change. Then, the computing platform may determine that the user interface component or the link potentially impacted by the change has been subsequently tested. Subsequently, the computing platform may cause the interactive graphical user interface to stop the visual highlighting of the user interface component or the link.

In some embodiments, the computing platform may receive, via the interactive graphical user interface, an indication of a selection of a selectable visual object associated with a link. Then, the computing platform may display, via the interactive graphical user interface, a message from a service call associated with the link.

In some embodiments, the computing platform may receive, via the interactive graphical user interface, an indication of a selection of a selectable visual object associated with a link. Then, the computing platform may display, for a user and a session and via the interactive graphical user interface, a session activity graph indicating user activity during the session.

In some embodiments, the computing platform may receive, via the interactive graphical user interface, an indication of a selection of a selectable visual object associated with a node or a link. Then, the computing platform may display, via the interactive graphical user interface, a portion of the code associated with the node or the link.

In some embodiments, the computing platform may determine, by the computing device, a coverage score indicative of a percentage of nodes and links in the production navigational graph that have been tested in a testing environment. Then, the computing platform may display, via the interactive graphical user interface, the coverage score.

In some embodiments, the computing platform may determine whether the coverage score is above a threshold percentage. Then, the computing platform may cause the interactive graphical user interface to stop the visual highlighting of the one or more of the user interface component potentially impacted by the change and the link potentially impacted by the change.

In some embodiments, the computing platform may identify a user interface component potentially impacted by the change. Then, the computing platform may determine, for the identified user interface component, a node visit score indicative of a number of times the identified user interface component is visited in the production environment, where the visual highlighting of the identified user interface component may be based on the node visit score.

In some embodiments, the computing platform may identify a link potentially impacted by the change. Then, the computing platform may determine, for the identified link, a link visit score indicative of a number of times the identified link is traversed in the production environment, where the visual highlighting of the identified link may be based on the link visit score.

In some embodiments, the computing platform may train a machine learning model to predict the one or more of the user interface component potentially impacted by the change and the link potentially impacted by the change. In some embodiments, the computing platform may retrieve, from a repository, historical data associated with changes in portions of the software code, and impacts to nodes and links, where the training of the machine learning model may be based on the historical data.

In some embodiments, the production navigational graph may be based on one or more of: a type of service, a type of user, a type of computing environment, and a type of computing device.

In some embodiments, the computing platform may parse, based on natural language processing, the first log data and the second log data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
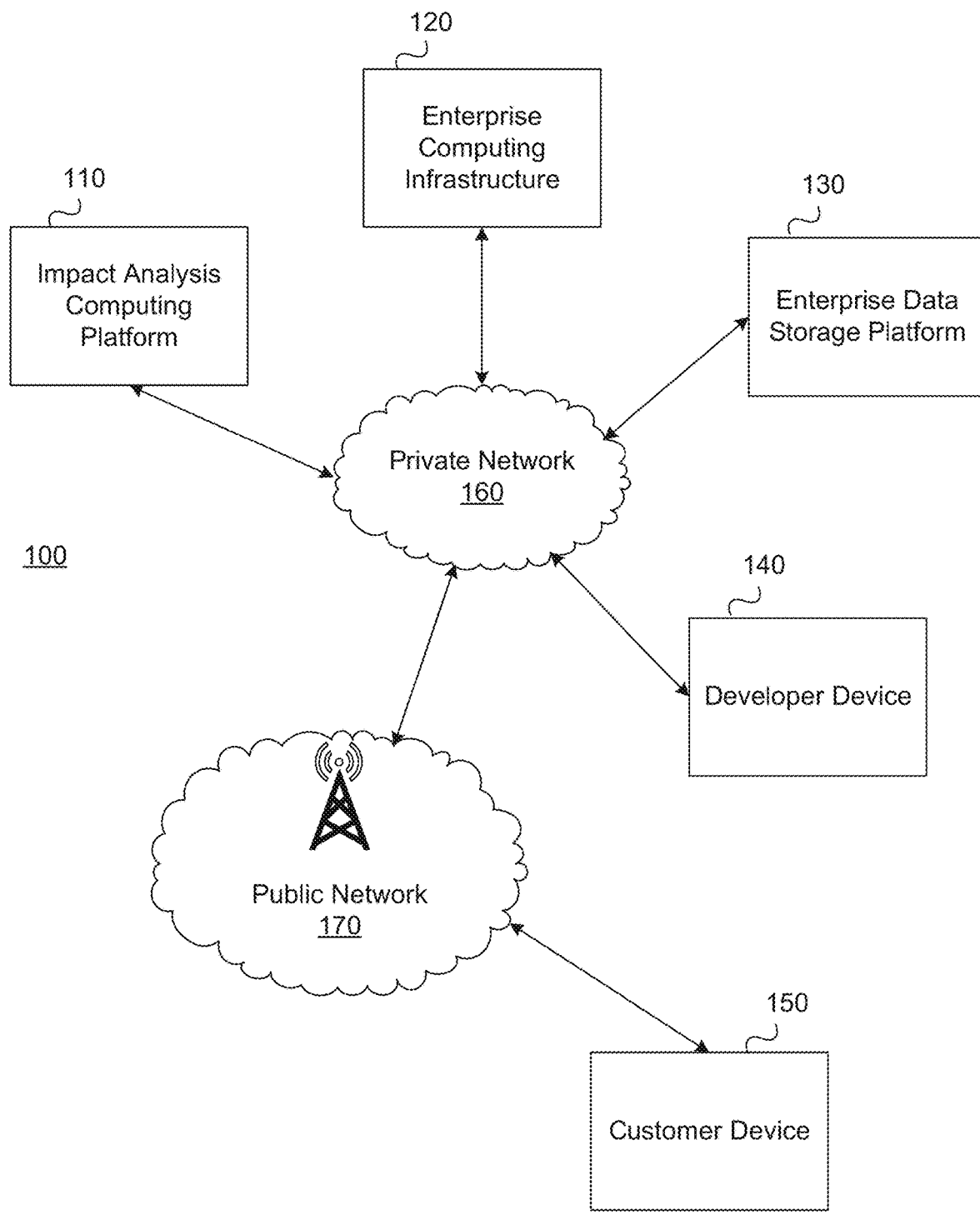
FIGS. 1A and 1B depict an illustrative computing environment for machine learning based impact analysis in a next-release quality assurance environment.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Organizations may deploy software applications to provide services. Generally, it may be of significant importance for an enterprise to keep such applications running smoothly. Accordingly, software applications may be tested before being released in a production environment. In some instances, aspects of the software application may be modified after the software application has been released in the production environment. Such modifications may impact a functioning of the software application in the production environment. However, there may be many ways to navigate the pages, screens of the application, and there may be a multitude of ways in which the menus, tabs, filters, displays, and so forth may function. In generally, it may not be feasible to identify every single navigational link that may have been impacted by the modifications to the software application. Developers may develop the software with a best-design approach, and testers may test the software to identify errors. However, once the software is released into the production environment, users may detect new paths to navigate the software. As these new paths were previously unknown to testers, these paths may not be identified as being impacted by the modifications to the software application. Failures to execute the processes associated with such paths may pose challenges to a smooth functioning of the software. Accordingly, rapid detection of such previously unknown paths, and correction of any run-time errors with speed and accuracy, may be of high significance for the enterprise organization.

In general, there are two methods of testing software testing. White box testing is based on a review of the actual underlying code. This may be time-consuming, and may not enable detection of all possible pages and/or links that me need to be tested. Also, for example, black box testing may be based on knowledge of functionality of the code, without actually reviewing the underlying code. Accordingly, it may be difficult to alter and/or modify specific parts of the code to correct errors. As described herein, a hybrid approach is described. A white box type testing, based on a comparison of production environment logs and changes made to the software code, may not require a comprehensive review of the underlying code. However, like in black box testing, an optimal test coverage for the software code may be provided without a knowledge of the underlying code.

Accordingly, it may be of high significance for an enterprise organization to devise ways in which to automatically identify a global and comprehensive impact of modifications to a software code, and create an effective, actionable error correction strategy, and provide recommendations with speed and accuracy. As described herein, the system may automatically build a class, service and screen dependency model from the latest release code. Next, the system may identify all dependency edges which may be impacted in the current release due to release code changes. Also, for example, the system may highlight the impacted screens, services on a test coverage graph. Some aspects of the disclosure relate to parsing production logs to extract customer activities and keep updating a possible screen navigation model.

Figure 1B:
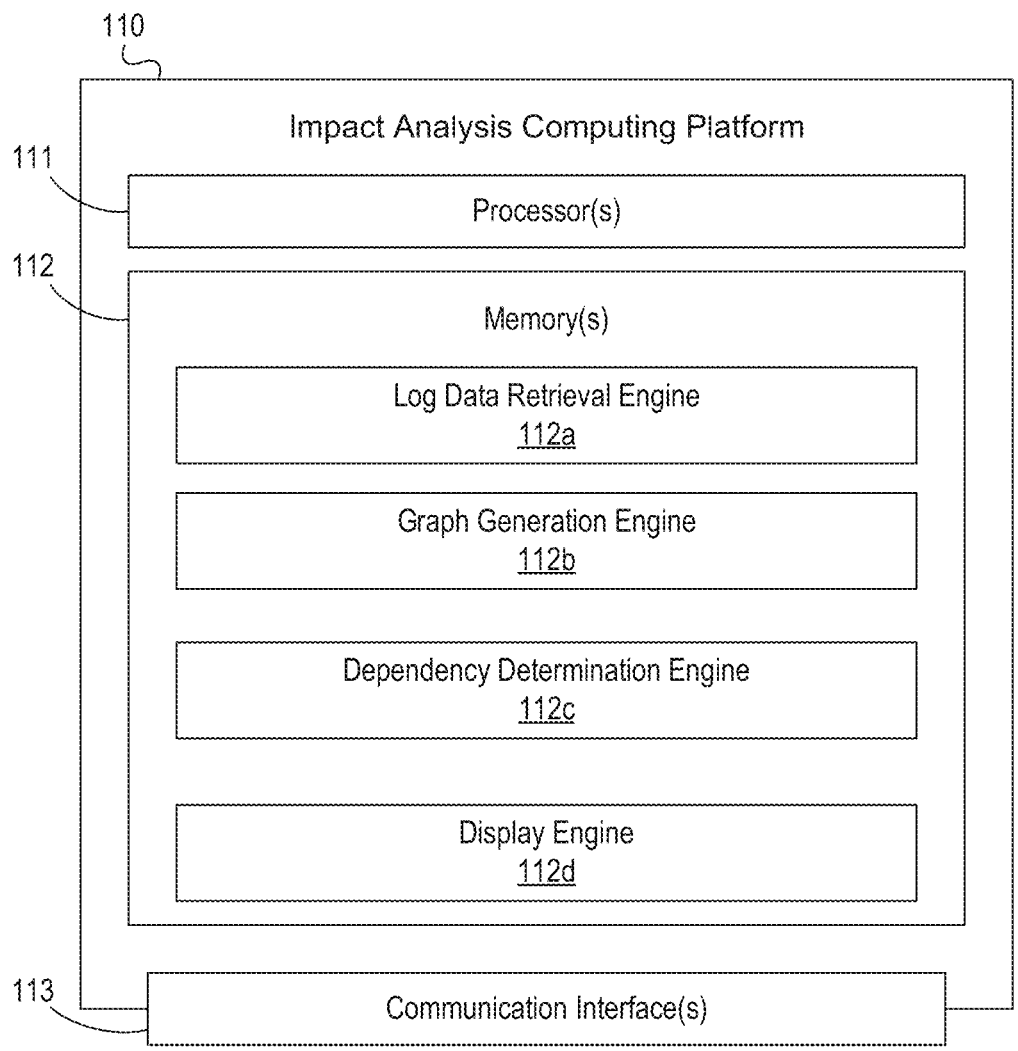

FIGS. 1A and 1B depict an illustrative computing environment for machine learning based impact analysis in a next-release quality assurance environment. Referring to FIG. 1A, computing environment 100 may include one or more computer systems. For example, computing environment 100 may include an impact analysis computing platform 110, enterprise computing infrastructure 120, an enterprise data storage platform 130, a developer device 140, and a customer device 150.

As illustrated in greater detail below, impact analysis computing platform 110 may include one or more computing devices configured to perform one or more of the functions described herein. For example, impact analysis computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more applications. For example, enterprise computing infrastructure 120 may be configured to host, execute, and/or otherwise provide one or more applications, such as, for example, banking applications, trading applications, mortgage applications, business loan applications, and/or other applications associated with an enterprise organization. In some instances, enterprise computing infrastructure 120 may be configured to provide various enterprise and/or back-office computing functions for an enterprise organization. For example, enterprise computing infrastructure 120 may include various servers and/or databases that store and/or otherwise maintain business information, information associated with business processes, and so forth. In addition, enterprise computing infrastructure 120 may process and/or otherwise execute actions based on scripts, commands and/or other information received from other computer systems included in computing environment 100. Additionally or alternatively, enterprise computing infrastructure 120 may receive instructions from impact analysis computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain log data associated with a production environment, release notes associated with a next-release version of a software product, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Developer device 140 may be a personal computing device (e.g., desktop computer, laptop computer) or mobile computing device (e.g., smartphone, tablet, wearable device). In addition, developer device 140 may be linked to and/or used by a developer to perform one or more operations associated with a software application, such as, for example, testing, debugging, modifying, releasing a new version, and so forth.

Customer device 150 may be a personal computing device (e.g., desktop computer, laptop computer) or mobile computing device (e.g., smartphone, tablet, wearable device), that may be a source of information. Also, for example, user of customer device 150 may be a customer of an enterprise organization hosting impact analysis computing platform 110.

Computing environment 100 also may include one or more networks, which may interconnect one or more of impact analysis computing platform 110, enterprise computing infrastructure 120, enterprise data storage platform 130, developer device 140, and/or customer device 150. For example, computing environment 100 may include a private network 160 (which may, e.g., interconnect impact analysis computing platform 110, enterprise computing infrastructure 120, enterprise data storage platform 130, developer device 140, and/or one or more other systems which may be associated with an organization, and public network 170 (which may, e.g., interconnect developer device 140 with private network 160 and/or one or more other systems, public networks, sub-networks, and/or the like). Public network 170 may be a cellular network, including a high generation cellular network, such as, for example, a 5G or higher cellular network. In some embodiments, private network 160 may likewise be a high generation cellular enterprise network, such as, for example, a 5G or higher cellular network. In some embodiments, computing environment 100 also may include a local network (which may, e.g., interconnect developer device 140 and one or more other devices with each other).

In one or more arrangements, enterprise computing infrastructure 120, enterprise data storage platform 130, developer device 140, and/or customer device 150, and/or the other systems included in computing environment 100 may be any type of computing device capable of receiving input via a user interface, and communicating the received input to one or more other computing devices. For example, enterprise computing infrastructure 120, enterprise data storage platform 130, developer device 140, and/or customer device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of impact analysis computing platform 110, enterprise computing infrastructure 120, enterprise data storage platform 130, developer device 140, and/or customer device 150, may, in some instances, be special-purpose computing devices configured to perform specific functions.

Referring to FIG. 1B, impact analysis computing platform 110 may include one or more processors 111, memory 112, and communication interface 113. A data bus may interconnect processor 111, memory 112, and communication interface 113. Communication interface 113 may be a network interface configured to support communication between impact analysis computing platform 110 and one or more networks (e.g., network 160, network 170, a local network, or the like). Memory 112 may include one or more program modules having instructions that when executed by processor 111 cause impact analysis computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of impact analysis computing platform 110 and/or by different computing devices that may form and/or otherwise make up impact analysis computing platform 110. For example, memory 112 may have, store, and/or include a log data retrieval engine 112a, a graph generation engine 112b, a dependency determination engine 112c, and a display engine 112d.

Log data retrieval engine 112a may have instructions that direct and/or cause impact analysis computing platform 110 to retrieve, by a computing device and for a software application, first log data associated with user navigation of one or more user interface components in a production environment. In some embodiments, log data retrieval engine 112a may have instructions that direct and/or cause impact analysis computing platform 110 to retrieve, by the computing device and for the software application, second log data associated with release notes for a next-release version of the software application.

Graph generation engine 112b may have instructions that direct and/or cause impact analysis computing platform 110 to generate, by the computing device and based on the first log data, a production navigational graph for the software application, wherein a node of the production navigational graph represents a user interface component visited by a user, and an edge between two nodes represents a navigational link traversed by the user.

Dependency determination engine 112c may have instructions that direct and/or cause impact analysis computing platform 110 to identify, by the computing device and based on the second log data, a change in a portion of a software code in the next-release version. In some embodiments, dependency determination engine 112c may have instructions that direct and/or cause impact analysis computing platform 110 to identify, by the computing device and based on the production navigational graph, one or more of: a user interface component potentially impacted by the change, and a link potentially impacted by the change.

Display engine 112d may have instructions that direct and/or cause impact analysis computing platform 110 to provide, via an interactive graphical user interface, the production navigational graph, where the one or more of the user interface component potentially impacted by the change and the link potentially impacted by the change are visually highlighted.

Generally, an enterprise organization may deploy a web and/or mobile application to provide services to a customer base. For example, an enterprise organization hosting enterprise computing infrastructure 120 may provide a mobile banking application. Such an application may provide a customer an ability to log in to their account, review account information, deposit checks, transfer money, review a credit rating, review and/or utilize offers from vendors, change login credentials, update account information, and so forth. The mobile application may provide one or more tabs, menu items, and so forth, to provide features to the customer. Accordingly, the mobile application may include one or more pages, and a plurality of links between the pages. Depending on a type of software application or web resource, there may be anywhere from a few hundred to millions of nodes. Also, for example, there may be multiple links between two nodes. The term "user interface component" as used herein may generally refer to a component of a software application that provides a user with visual interfaces, scenarios, selectable visual objects, views, requests, and/or scenarios. For example, a user interface component may be a page in a web resource, or a page or a screen in a software application. For example, a user interface component may be a page on the world wide web ("WWW"). Also, for example, a user interface component may refer to different pages displayed in a software application.

For example, a first customer may login from a main page of the mobile application, and may navigate to a page displaying a balance in a checking account, before proceeding to a page that enables the first customer to transfer money. Also, for example, a second customer may login from the main page, and navigate directly to the page that enables the second customer to transfer money. Also, for example, a third customer may login from the main page, navigate to a page that enables the third customer to deposit a check, and may then navigate to the page that enables the third customer to transfer money. Accordingly, all three customers navigated from the home page to the page that allows money transfer, but followed different links to get there.

When a software application (e.g., a mobile application) is developed, a developer may write the code to create a functionality. Also, for example, one or more user interface components may be created to host services, and links between these user interface components may be created. Prior to release of the software application, the developer may test one or more of the user interface components and associated links. However, in general, for a complex software application, it may not be feasible to identify and/or test every user interface component, or every link. Accordingly, when the software application is released and made available to a customer, activities in the production environment may reveal issues with user interface components and/or links. An ability to quickly identify such errors and/or performance issues may be of high significance to the enterprise organization in order to provide a smooth and seamless customer experience.

In some embodiments, impact analysis computing platform 110 may retrieve, by a computing device and for a software application, first log data associated with user navigation of one or more user interface components in a production environment. Customer activity in the production environment may be monitored and logged. For example, when a customer logs in, a session identifier may be generated for the particular session. As the customer navigates the application and visits various user interface components and follows various links, each such activity may be logged as first log data, including, for example, a time of activity, an error code associated with the activity, any service calls made as a result of the activity, and so forth. A "service call" as used herein, may generally refer to code that may be called and/or executed when following a link from one user interface component to another.

Such logged data may be stored in an enterprise storage platform (e.g., enterprise storage platform 130). In some embodiments, impact analysis computing platform 110 may retrieve the first log data from the enterprise storage platform (e.g., enterprise storage platform 130). In some embodiments, impact analysis computing platform 110 may retrieve the first log data directly from the software application in production. For example, as a customer navigates the software application, impact analysis computing platform 110 may retrieve the first log data in real-time.

Generally, a software application may be configured for a variety of devices with various operating platforms. Also, for example, different aspects of a software application may be available to different customers. For example, a customer who has a checking account may be able to navigate a first aspect of the software application that provides features associated with checking account. As another example, a customer who has a trading account may be able to navigate a second aspect of the software application that provides features associated with trading account. In some embodiments, one or more user interface components, and/or links between user interface components, may be common to the first aspect and the second aspect.

In some embodiments, impact analysis computing platform 110 may generate, by the computing device and based on the user navigation, a production navigational graph for the software application, where a node of the production navigational graph may represent a user interface component visited by a user, and an edge between two nodes may represent a navigational link between two user interface components visited by the user. For example, a first customer may login from a main page of the mobile application, and may navigate to a page displaying a balance in a checking account, before proceeding to a page that enables the first customer to transfer money. Accordingly, a first node may represent the main page, a second node may represent the page displaying the balance, and a third node may represent the money transfer page. A first edge may be associated with the link from the main page to the page displaying the balance, and a second edge may be associated with the link from the page displaying the balance to the money transfer page.

Also, for example, a second customer may login from the main page, and navigate directly to the page that enables the second customer to transfer money. Accordingly, a third edge may be associated with the link from the main page to the money transfer page. Also, for example, a third customer may login from the main page, navigate to a page that enables the third customer to deposit a check, and may then navigate to the page that enables the third customer to transfer money. Accordingly, a fourth node may represent the check deposit page. Also, for example, a fourth edge may be associated with the link from the main page to the check deposit page, and a fifth edge may be associated with the link from the check deposit page to the money transfer page.

In some embodiments, impact analysis computing platform 110 may retrieve, by the computing device and for the software application, second log data associated with release notes for a next-release version of the software application. A "next-release version" as used herein may include an upgrade or an update. In some instances, one or more smaller updates may be grouped together into larger feature changes for the software application. Generally, a code underlying a software application may be modified. For example, a version of a software application may be modified by adding bug fixes, enhancements, improvements, and so forth. Generally, there may be several types of changes to a software application, including, for example, a corrective change, an adaptive change, a preventive change, and/or a perfective change. Accordingly, second log data may indicate whether a page and/or a link has been changed. In some embodiments, impact analysis computing platform 110 may retrieve first log data and second log data, and may utilize natural language processing (NLP) to parse the logs. For example, impact analysis computing platform 110 may parse the logs and identify whether a page and/or a link has been changed.

In some embodiments, impact analysis computing platform 110 may identify, by the computing device and based on the second log data, a change in a portion of a software code in the next-release version. For example, changes to an underlying code may be made to user interface components corresponding to bill pay and funds transfer. Accordingly, impact analysis computing platform 110 may parse the release notes for the next-release version and identify the changes to the underlying code for user interface components corresponding to bill pay and funds transfer. Also, for example, impact analysis computing platform 110 may identify one or more navigational links that connect the user interface components corresponding to bill pay and funds transfer to other user interface components.

In some embodiments, impact analysis computing platform 110 may identify, by the computing device and based on the production navigational graph, one or more of: a user interface component potentially impacted by the change, and a link potentially impacted by the change. The term "potentially" may generally indicate that the user interface component or link may, in some instances, not be actually impacted. However, based on a dependency on the change, the user interface component or link may be flagged as potentially impacted. For example, changes to an underlying code may be made to user interface components corresponding to bill pay and funds transfer. However, a user interface component corresponding to check deposit may be potentially impacted by the changes. Accordingly, the navigational links between the user interface component corresponding to check deposit, and the user interface components corresponding to bill pay and funds transfer, may be potentially impacted as well.

Identifying such dependencies between user interface components and corresponding links may be a challenging task. For example, a developer may not be aware of all possible user interface components and/or links that may exist in a software application. Accordingly, analyzing the production navigational graph may be of high significance in identifying the dependencies. Also, for example, depending on a size of the production navigational graph, a number of dependencies may be in the millions. Also, for example, dependencies may be based on a type of operating environment for the software application, a device, a type of user activity, a type of account, and so forth. As described herein, a fast, efficient and reliable process is described that ensure identification of the dependencies.

In some embodiments, impact analysis computing platform 110 may provide, via an interactive graphical user interface, the production navigational graph, wherein the one or more of the user interface component potentially impacted by the change and the link potentially impacted by the change are visually highlighted. For example, the interactive graphical user interface may provide one or more menu options, selectable tabs, icons, and so forth. In particular, the nodes and edges of the production navigational graph may be displayed as selectable visual objects. For example, activities such as, for example, hovering over a node, clicking on the node, and so forth, may display information associated with the node. Also, for example, hovering over a link, clicking the link, and so forth, may display information associated with the link. In some embodiments, impact analysis computing platform 110 may highlight the nodes and/or links that are impacted by the changes to the software code. Generally, a developer may review such highlighted information and test the relevant nodes and/or links to ensure that the software application is running smoothly.

Figure 2:
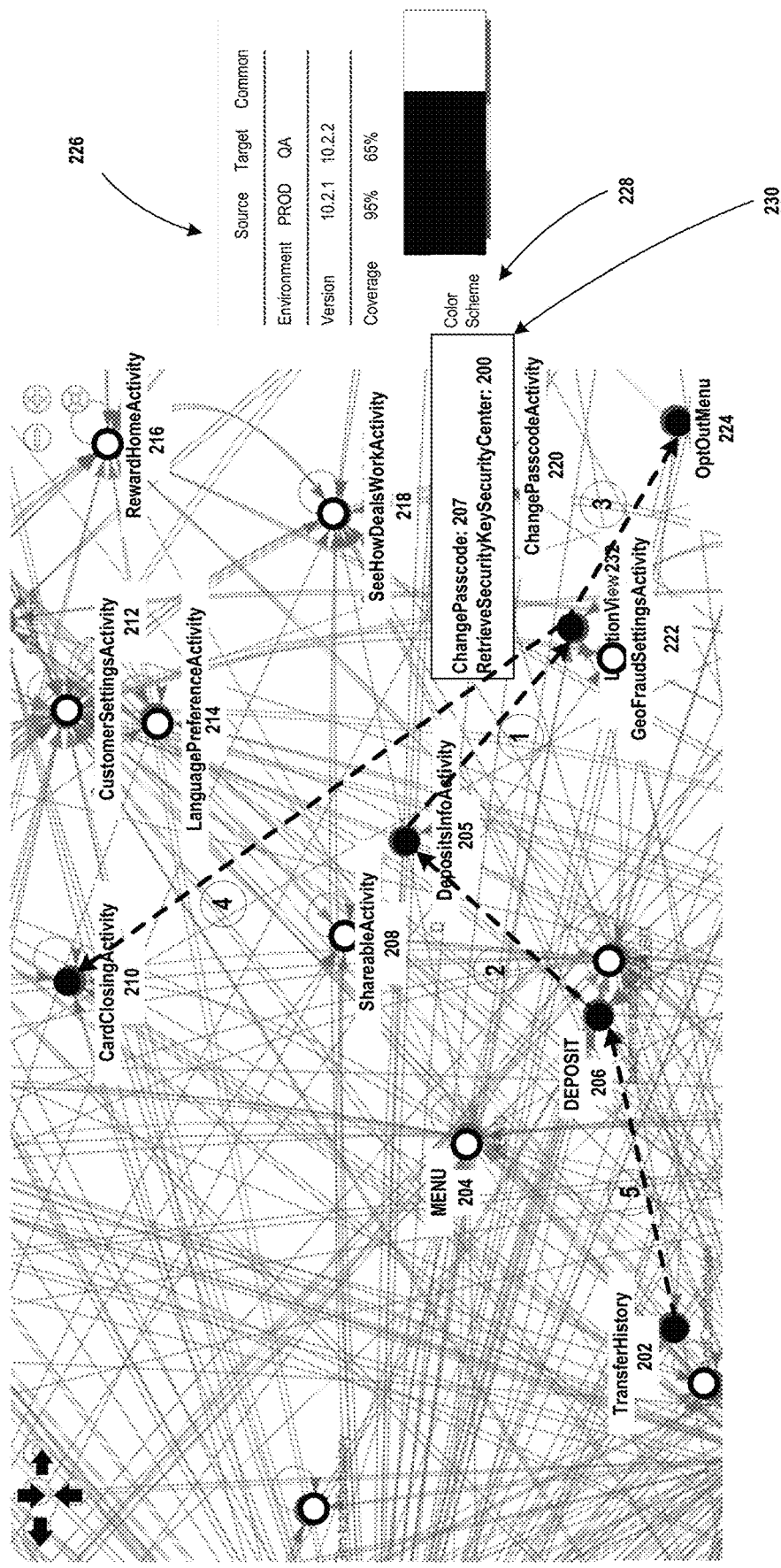
FIG. 2 depicts an illustrative production navigational graph for machine learning based impact analysis in a next-release quality assurance environment.

FIG. 2 depicts an illustrative production navigational graph for machine learning based impact analysis in a next-release quality assurance environment. Referring to FIG. 2, a number of nodes and edges displayed are for illustrative purposes only. Generally, FIG. 2 may depict a portion of a production navigational graph. In some embodiments, the entire production navigational graph may be displayed and a user may zoom in to particular portions of the production navigational graph. Also, for example, in some instances, the production navigational graph may be large and portions of it may be available for display. In some embodiments, the interactive graphical user interface may provide selectable features that may enable options to filter the data presented. For example, the production navigational graph may be provided for specific types of devices, operating systems, types of users, types of applications, types of accounts, and so forth. In some embodiments, the production navigational graph may be provided for data from a certain period of time. For example, the first log data may be filtered based on a time window, and the production navigational graph may be based on such filtered data.

Generally, the production environment may be based on one or more of: a type of service, a type of user, a type of operating environment, and a type of computing device. Accordingly, the first log data and the second log data may depend on such factors. Consequently, the production navigational graph, may also depend on such factors.

As illustrated, one or more nodes corresponding to pages are displayed. For example, a node for TransferHistory 202 may represent a page that provides information associated with a history of fund transfers. A node for Manu 204 may represent a page that provides information associated with a main menu for the software application. A node for Deposit 206 may represent a page that provides information associated with deposits. As another example, a node for DepositsInfoActivity 205 may represent a page that provides information associated with information associated with deposit activity. Another node for ShareableActivity 208 may represent a page that provides information associated with activities that enable sharing of user information. CardClosingActivity 210 may represent a page that provides information associated with activities that enable a user to close an account associated with a card (e.g., a credit card, a cash rewards card, a debit card, and so forth). CustomerSettingsActivity 212 may represent a page that provides information associated with activities related to customer settings. LanguagePreferenceActivity 214 may represent a page that provides information associated with activities related to a customer's language preferences. As another example, RewardHomeActivity 216 may represent a home page that provides information associated with rewards programs. Likewise, nodes such as SeeHowDealsWorkActivity 218, ChangePasscodeActivity 220, GeoFraudSettingsActivity 222, OptOutMenu 224 and LocationView 232, may be provided.

As indicated, some nodes may be represented with a filled in circle (e.g., filled in with a first color), and some nodes may be represented with a circle that is not filled in (or filled in with a second color different from the first color). As described herein, nodes that are represented with a filled in circle indicate nodes that were impacted by changes to the software code. For example, TransferHistory 202, DepositsInfoActivity 205, Deposit 206, CardClosingActivity 210, LocationView 232, and OptOutMenu 224 are indicated as nodes that were visited in the production environment, and that are impacted by changes to software code.

Also, for example, nodes represented with a circle that is not filled-in indicate nodes that were visited in the production environment, but that are not impacted by changes to software code. For example, Menu 204, ShareableActivity 208, CustomerSettingsActivity 212, LanguagePreferenceActivity 214, RewardHomeActivity 216, SeeHowDealsWorkActivity 218, and GeoFraudSettingsActivity 222 are indicated as nodes that were visited in the production environment and that were not impacted by changes to software code.

Also, for example, an arrow from one node to another indicates a navigational path from one user interface component to another. In some embodiments, a link represented by a dashed arrow (or an arrow displayed in a first color) may indicate that the link was visited in the production environment, and impacted by changes to the software code. For example, dashed arrows 1, 2, 3, 4, and 5 are illustrative examples. Also, for example, a solid arrow (or an arrow displayed in a second color different than the first color) may indicate that the link was visited in the production environment, and was not impacted by changes to the software code.

In some embodiments, impact analysis computing platform 110 may identify dependencies form the production navigational graph. For example, initially, nodes in the production navigational graph may be represented with a circle that is not filled-in, and links may be represented by solid arrows. In some instances, a software code underlying LocationView 232 may have been modified in the next-release version. Accordingly, impact analysis computing platform 110 may highlight the node for LocationView 232 with a filled-in circle.

In the production navigational graph, Arrow 1 indicates a navigational link from DepositsInfoActivity 205 to LocationView 232. Accordingly, a change to the software code underlying LocationView 232 may impact the software code associated with the navigational link from DepositsInfoActivity 205 to LocationView 232. Accordingly, impact analysis computing platform 110 may identify DepositsInfoActivity 205 as being dependent on LocationView 232 and may highlight the node for DepositsInfoActivity 205 with a filled-in circle. Also, for example, Arrow 1 is a navigational link between DepositsInfoActivity 205 and LocationView 232, and impact analysis computing platform 110 may identify Arrow 1 as being dependent on LocationView 232. Accordingly, impact analysis computing platform 110 may highlight Arrow 1 with a dashed arrow.

As another example, Arrow 2 indicates a navigational link from Deposit 206 to DepositsInfoActivity 205. Accordingly, a change to the software code underlying LocationView 232 may impact DepositsInfoActivity 205, and may therefore impact Deposit 206. Accordingly, impact analysis computing platform 110 may identify Deposit 206 as being dependent on LocationView 232 and may highlight the node for Deposit 206 with a filled-in circle. Also, for example, Arrow 2 is a navigational link between Deposit 206 and DepositsInfoActivity 205, and impact analysis computing platform 110 may identify Arrow 2 as being dependent on LocationView 232. Accordingly, impact analysis computing platform 110 may highlight Arrow 2 with a dashed arrow.

Also, for example, Arrow 5 indicates a navigational link from TransferHistory 202 to Deposit 206. Accordingly, a change to the software code underlying LocationView 232 may impact DepositsInfoActivity 205, and Deposit 206, and may therefore impact TransferHistory 202. Accordingly, impact analysis computing platform 110 may identify TransferHistory 202 as being dependent on LocationView 232 and may highlight the node for TransferHistory 202 with a filled-in circle. Also, for example, Arrow 5 is a navigational link between TransferHistory 202 and Deposit 206, and impact analysis computing platform 110 may identify Arrow 5 as being dependent on LocationView 232. Accordingly, impact analysis computing platform 110 may highlight Arrow 5 with a dashed arrow.

As another example, Arrow 3 indicates a navigational link from LocationView 232 to OptOutMenu 224. Accordingly, a change to the software code underlying LocationView 232 may impact OptOutMenu 224. Accordingly, impact analysis computing platform 110 may identify OptOutMenu 224 as being dependent on LocationView 232 and may highlight the node for OptOutMenu 224 with a filled-in circle. Also, for example, Arrow 3 is a navigational link between LocationView 232 and OptOutMenu 224, and impact analysis computing platform 110 may identify Arrow 3 as being dependent on LocationView 232. Accordingly, impact analysis computing platform 110 may highlight Arrow 3 with a dashed arrow.

Also, for example, Arrow 4 indicates a navigational link from LocationView 232 to CardClosingActivity 210. Accordingly, a change to the software code underlying LocationView 232 may impact CardClosingActivity 210. Accordingly, impact analysis computing platform 110 may identify CardClosingActivity 210 as being dependent on LocationView 232 and may highlight the node for CardClosingActivity 210 with a filled-in circle. Also, for example, Arrow 4 is a navigational link between LocationView 232 and CardClosingActivity 210, and impact analysis computing platform 110 may identify Arrow 4 as being dependent on LocationView 232. Accordingly, impact analysis computing platform 110 may highlight Arrow 4 with a dashed arrow.

As first log data and second log data is parsed for more information, additional dependencies may be identified and highlighted on the production navigational graph.

As described herein, impact analysis computing platform 110 may identify a user interface component or a link potentially impacted by the change. The user interface component or link may be highlighted in the production navigational graph. Subsequently, a developer or tester may test the user interface component or link, and corresponding release notes may be updated. Accordingly, impact analysis computing platform 110 may parse the updated release notes, and determine that the user interface component and/or link has been subsequently tested. Subsequently, impact analysis computing platform 110 may cause the interactive graphical user interface to stop the visual highlighting of the user interface component or the link.

For example, impact analysis computing platform 110 may identify Arrow 4 as being dependent on LocationView 232. Accordingly, impact analysis computing platform 110 may highlight Arrow 4 with a dashed arrow, and in some embodiments, a notification may be provided to a developer, and the developer may test Arrow 4. Based on updated release notes, impact analysis computing platform 110 may determine that Arrow 4 has been subsequently tested, and based on such determination, impact analysis computing platform 110 may stop highlighting Arrow 4 with a dashed arrow (or a first color), and change it to a solid arrow (or a second color second color different from the first color).

Similarly, impact analysis computing platform 110 may identify CardClosingActivity 210 as being dependent on LocationView 232 and may highlight the node for CardClosingActivity 210 with a filled-in circle. In some embodiments, a notification may be provided to a developer, and the developer may test CardClosingActivity 210. Based on updated release notes, impact analysis computing platform 110 may determine that CardClosingActivity 210 has been subsequently tested, and based on such determination, impact analysis computing platform 110 may stop highlighting CardClosingActivity 210 with a filled-in circle (or a first color), and change it to a circle that is not filled-in (or filled-in with a second color second color different from the first color).

In some embodiments, a color scheme 228 may indicate a legend for colors utilized to represent nodes and/or links. In some embodiments, a third color may be utilized to indicate nodes and/or links that may be introduced in the testing environment, but that have not been released in the production environment.

In some embodiments, impact analysis computing platform 110 may determine, by the computing device, a coverage score indicative of a percentage of nodes and links in the production navigational graph that have been tested in a testing environment. Then, impact analysis computing platform 110 may display, via the interactive graphical user interface, the coverage score. For example, impact analysis computing platform 110 may display information in a tabular format 226. A version of the software application in the production environment may be v. 10.2.1, and an updated version (e.g., next-release version) may be v. 10.2.2. As indicated, a coverage of 90% in the production environment indicates that 90% of the pages and/or links have been visited in the production environment. However, a coverage of 65% in the quality assurance (QA) environment indicates that 65% of the pages and/or links have been tested in the QA environment. For example, of all the nodes and/or links that are identified as dependent, 65% of those have been tested.

In some embodiments, impact analysis computing platform 110 may determine whether the coverage score is above a threshold percentage. For example, based on a type of software, an operating environment for the software, and so forth, impact analysis computing platform 110 may determine that a threshold percentage of 98% is needed for quality assurance. Accordingly, impact analysis computing platform 110 may continue to parse log data and update the production navigational graph and the coverage score. Then, impact analysis computing platform 110 may cause the interactive graphical user interface to stop the visual highlighting of the one or more of the user interface component potentially impacted by the change and the link potentially impacted by the change. For example, based on a determination that the coverage score is at or above 98%, impact analysis computing platform 110 may stop highlighting the impacted nodes and/or links.

In some embodiments, impact analysis computing platform 110 may receive, via the interactive graphical user interface, an indication of a selection of a selectable visual object associated with a link. Then, impact analysis computing platform 110 may display a message from a service call associated with the link. For example, hovering over the link, clicking the link, and so forth, may display message from the service call associated with the link. For example, a message 230 may be displayed. In some instances, message 230 may display a service call and an error code associated with the service call. For example, "changePasscode: 207" may indicate that the service call "changePasscode" was executed and was partially successful. For example, the error code "207" may indicate that although the service call for "changePasscode" was successful, the echo was not detected. As another example, the error code "200" in "RetrieveSecurityKeySecurityCenter: 200" may indicate that the service call "RetrieveSecurityKeySecurityCenter" was executed successfully. Another example of an error code may be "500" that may indicate that the system is down.

In some embodiments, impact analysis computing platform 110 may receive, via the interactive graphical user interface, an indication of a selection of a selectable visual object associated with a node or a link. Then, impact analysis computing platform 110 may display, via the interactive graphical user interface, a portion of the code associated with the node or the link. Accordingly, when a page corresponding to a node has not been tested, a developer may review the code portion via the graphical user interface. Also, for example, if a link is associated with a failed service call, then the developer may review the code portion via the graphical user interface to identify potential errors in the code.

In some embodiments, impact analysis computing platform 110 may receive, via the interactive graphical user interface, an indication of a selection of a selectable visual object associated with a link. Then, impact analysis computing platform 110 may display, for a user and a session and via the interactive graphical user interface, a session activity graph indicating user activity during the session. In some embodiments, although a service call associated with a link may fail, an analysis of the user activity during the session may need to be analyzed. Accordingly, the session activity graph may be generated. The session activity graph may comprise nodes corresponding to pages, and edges corresponding to links between pages, and blocks that may provide information for service calls associated with the link.

Figure 3:
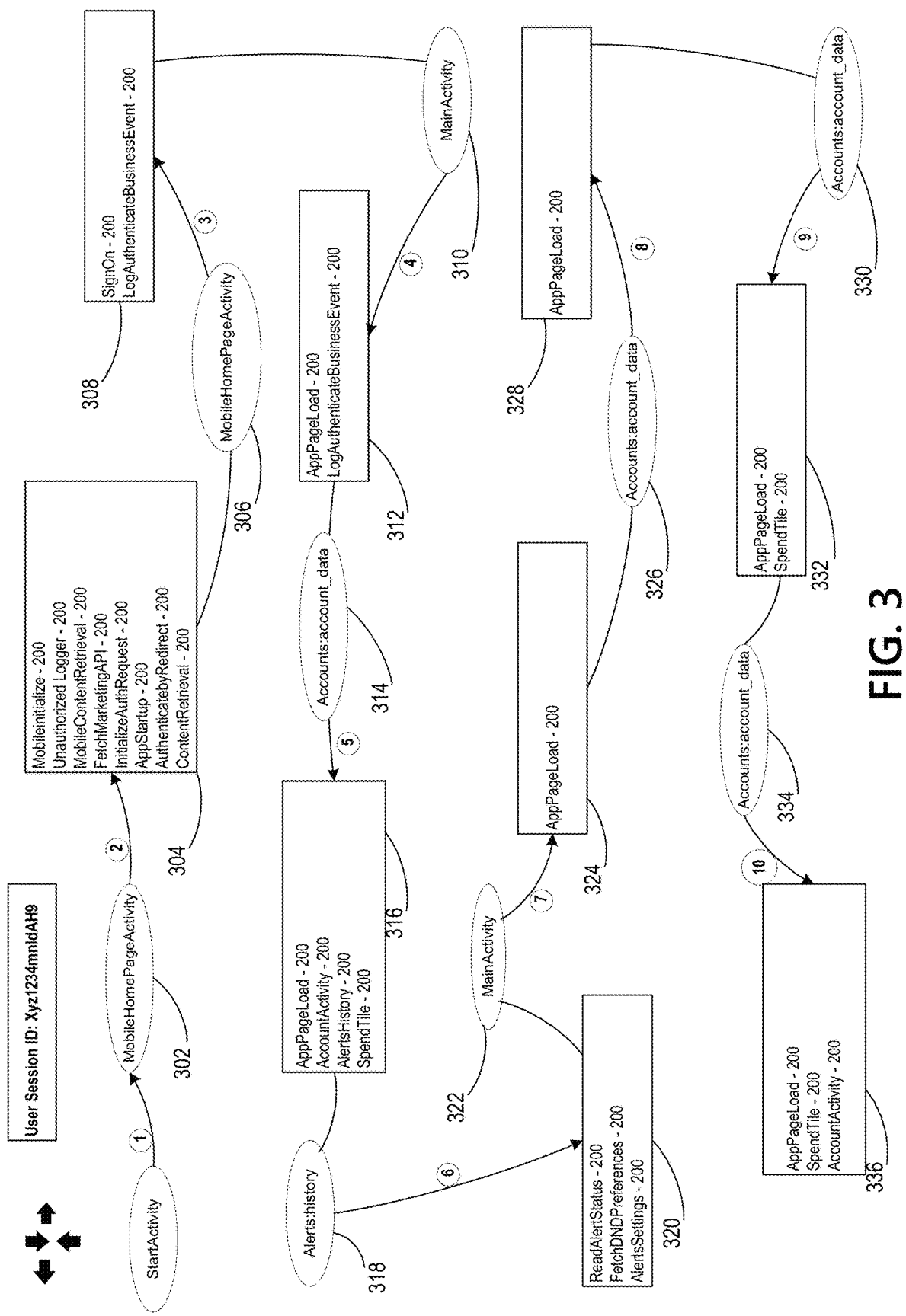
FIG. 3 depicts an illustrative user session activity graph for machine learning based impact analysis in a next-release quality assurance environment.

FIG. 3 depicts an illustrative user session activity graph for machine learning based impact analysis in a next-release quality assurance environment. As indicated, the session activity graph is illustrated with oval-shaped nodes that indicate a screen or page that a customer is visiting, a rectangular box that includes information about one or more service calls along with error codes, and edges that link the oval-shaped nodes, indicating navigation links between screens or pages. As indicated, the user and the session may be associated with a session identifier, such as, "xyz1234mnldAH9." The user may begin at a node "StartActivity," and at link 1, may navigate to a screen corresponding to MobileHomePageActivity 302. Then, the user may navigate, via link 2, to a screen corresponding to MobileHomePageActivity 306. The service calls associated with link 2 may be provided in block 304. In some instances, MobileHomePageActivity 302 and MobileHomePageActivity 306 may be the same screen. For example, a user may have selected a tab or a link on MobileHomePageActivity 302 that may land the user back to the same screen.

The user may then navigate, via link 3, to MainActivity 310, and the service calls associated with link 3 may be provided in block 308. Subsequently, the user may navigate from MainActivity 310 to Accounts:account_data 314 via link 4, and the service calls associated with link 4 may be provided in block 312. Then, the user may navigate to AlertsHistory 318 via link 5, and the service calls associated with link 5 may be provided in block 316. For example, service calls may include, AppPageLoad, AccountActivity, AlertsHistory, and SpendTile. Also, for example, an error code of 200 indicates that the service calls were successfully executed.

From AlertsHistory 318, the user may navigate, via link 6, to MainActivity 322, and the service calls associated with link 6 may be provided in block 320. Next, the user may navigate to Accounts:account_data 326 via link 7, and the service calls associated with link 7 may be provided in block 324. Subsequently, the user may select a page upload activity to navigate to the same screen Accounts:account_data 330 via link 8, and the service calls associated with link 8 may be provided in block 328. Then, the user may navigate to Accounts:account_data 334 via link 9, and the service calls associated with link 9 may be provided in block 332. Finally, the user may traverse link 10 with associated service calls listed in block 336.

Generally, the session activity graph may provide detailed information about a user activity during a single session. Accordingly, a developer may be able to quickly review the session activity graph to detect errors. In some embodiments, impact analysis computing platform 110 automatically determine, based on an error code, a possible service call that may have caused an error.

In some embodiments, impact analysis computing platform 110 may update, based on the first log data, the production navigational graph. For example, as a user uses the software application in the production environment, real-time log data may be retrieved. Accordingly, impact analysis computing platform 110 may update, based on the first log data, the production navigational graph. Likewise, as changes are made to a code in the quality assurance environment, impact analysis computing platform 110 may retrieve second log data, and may update, based on the second log data, dependencies in the production navigational graph. Generally, first log data may be updated in real-time or near real-time. In some embodiments, first log data may be updated hourly, daily, and so forth. Developers, though may work on a project for a longer period of time, say, 3 months, or 6 months. Accordingly, the second log data may be updated at longer time intervals.

In some embodiments, impact analysis computing platform 110 may identify a user interface component potentially impacted by the change. Then, impact analysis computing platform 110 may determine, for the identified user interface component, a node visit score indicative of a number of times the identified user interface component is visited in the production environment. For example, impact analysis computing platform 110 may determine the node visit score based on the parsing of the first log data. In some embodiments, the node visit score may be indicative of a relative significance of a user interface component in the production environment. For example, referring to FIG. 2, there are a large number of links to and from CustomerSettingsActivity 212, indicating that a large number of users visit CustomerSettingsActivity 212. Accordingly, impact analysis computing platform 110 may associate a higher node visit score with CustomerSettingsActivity 212. Also, for example, there are fewer links to and from DepositsInfoActivity 205, indicating that fewer users visit DepositsInfoActivity 205. Accordingly, impact analysis computing platform 110 may associate a lower node visit score with DepositsInfoActivity 205.

In some embodiments, impact analysis computing platform 110 may highlight the identified user interface component based on the node visit score. For example, impact analysis computing platform 110 may identify Deposit 206 and DepositsInfoActivity 205 as dependent on LocationView 232. Accordingly, nodes associated with Deposit 206 and DepositsInfoActivity 205 may be associated with filled-in circles. Additionally, impact analysis computing platform 110 may associate a higher node visit score with Deposit 206 than with DepositsInfoActivity 205. In some embodiments, impact analysis computing platform 110 may select a color scheme based on the node visit score, and may associate Deposit 206 with a first color indicative of the higher node visit score, and may associate DepositsInfoActivity 205 with a second color indicative of the lower node visit score. Accordingly, when a developer or tester views the graphical user interface, the developer and tester may be able to prioritize testing based on the color scheme. For example, a node with a higher node visit score is more likely to be visited by customers in the production environment, and may therefore be allocated a higher priority for testing. Similarly, a node with a lower node visit score is less likely to be visited by customers in the production environment, and may therefore be allocated a lower priority for testing.

As described with reference to the scores for nodes, similar scores may be determined for links. For example, impact analysis computing platform 110 may identify a link potentially impacted by the change. Then, impact analysis computing platform 110 may determine, for the identified link, a link visit score indicative of a number of times the identified link is traversed in the production environment, and the visual highlighting of the identified link may be based on the link visit score.

For example, impact analysis computing platform 110 may identify Arrow 2 and Arrow 4 as dependent on LocationView 232. Accordingly, Arrow 2 and Arrow 4 may be represented as dashed arrows. Additionally, impact analysis computing platform 110 may associate a higher link visit score with Arrow 2 than with Arrow 4. In some embodiments, impact analysis computing platform 110 may select a color scheme based on the link visit score, and may associate Arrow 2 with a first color indicative of the higher link visit score, and may associate Arrow 4 with a second color indicative of the lower link visit score. Accordingly, when a developer or tester views the graphical user interface, the developer and tester may be able to prioritize testing based on the color scheme. For example, a link with a higher link visit score is more likely to be traversed by customers in the production environment, and may therefore be allocated a higher priority for testing. Similarly, a link with a lower link visit score is less likely to be traversed by customers in the production environment, and may therefore be allocated a lower priority for testing.

In some embodiments, impact analysis computing platform 110 may train a machine learning model to predict the one or more of the user interface component potentially impacted by the change and the link potentially impacted by the change. Generally, a machine learning model may be trained to detect patterns in first log data and second log data based on types of devices, operating systems, types of users, types of applications, types of accounts, volume of traffic, location of users, and so forth. For example, a K-Means clustering algorithm may be utilized to detect such patterns. For example, the machine learning model may be trained to detect patterns based on first log data and second log data, and identify classes of customer types, device types, account types, and so forth. Additional factors, such as, a time of day, a geographical location of customers, operating systems, working hours of the enterprise organization, and so forth may be accounted for.

In some embodiments, impact analysis computing platform 110 may retrieve, from a repository, historical data associated with changes in portions of the software code, and impacts to nodes and links, where the training of the machine learning model may be based on the historical data. For example, impact analysis computing platform 110 may store log data from customer sessions, previously released code versions, previously detected dependencies, and so forth, in an enterprise data storage platform (e.g., enterprise data storage platform 130). Accordingly, the machine learning model may detect patterns based on the historical data, and predict the one or more of the user interface component potentially impacted by the change and the link potentially impacted by the change In some embodiments, impact analysis computing platform 110 may train the machine learning model to determine the link visit score and the node visit score. For example, the machine learning model may first classify the activity based on the patterns detected, and may then identify a significance of a link in the production environment by determining a number of times the link is traversed in the production environment. Also, for example, the machine learning model may identify a significance of a node in the production environment by determining a number of times the node is visited in the production environment. In some embodiments, impact analysis computing platform 110 may train the machine learning model to determine a color scheme for nodes and links to indicate relative priorities.

Figure 4:
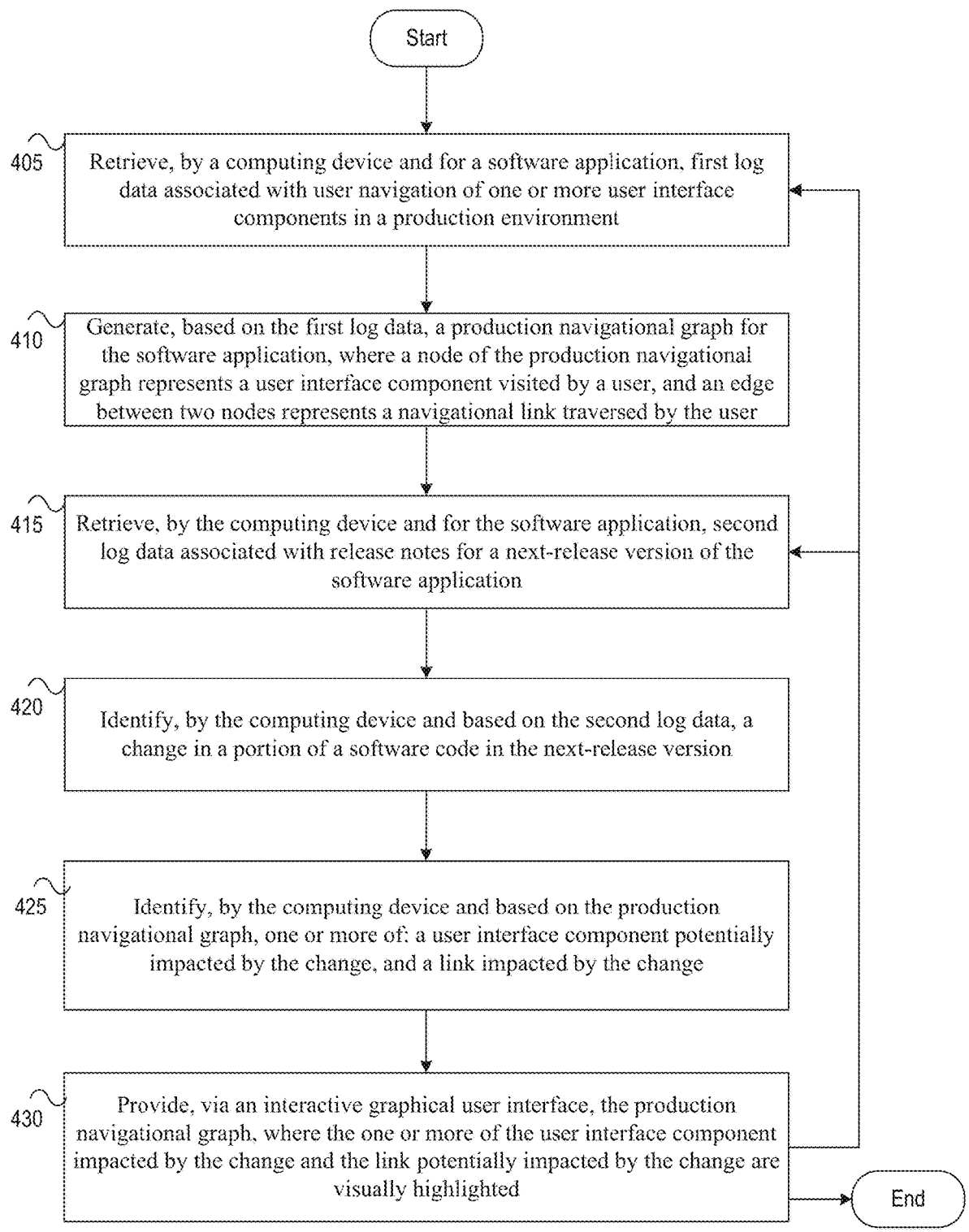
FIG. 4 depicts another illustrative method for machine learning based impact analysis in a next-release quality assurance environment.

FIG. 4 depicts an illustrative method for machine learning based impact analysis in a next-release quality assurance environment. Referring to FIG. 4, at step 405, an impact analysis computing platform 110, having at least one processor, and memory storing computer-readable instructions that, when executed by the at least one processor, cause impact analysis computing platform 110 to retrieve, by a computing device and for a software application, first log data associated with user navigation of one or more user interface components in a production environment. At step 410, impact analysis computing platform 110 may generate, by the computing device and based on the first log data, a production navigational graph for the software application, wherein a node of the production navigational graph represents a user interface component visited by a user, and an edge between two nodes represents a navigational link traversed by the user. At step 415, impact analysis computing platform 110 may retrieve, by the computing device and for the software application, second log data associated with release notes for a next-release version of the software application. At step 420, impact analysis computing platform 110 may identify, by the computing device and based on the second log data, a change in a portion of a software code in the next-release version.

At step 425, impact analysis computing platform 110 may identify, by the computing device and based on the production navigational graph, one or more of: a user interface component potentially impacted by the change, and a link potentially impacted by the change. At step 430, impact analysis computing platform 110 may provide, via an interactive graphical user interface, the production navigational graph, wherein the one or more of the user interface component potentially impacted by the change and the link potentially impacted by the change are visually highlighted. In some embodiments, the process may return to step 405 to retrieve additional first log data and update the production navigational graph. In some embodiments, the process may return to step 415 to retrieve additional second log data and update changes to additional user interface components and/or links.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor; and
    memory storing computer-readable instructions that, when executed by the at least one processor, cause the computing platform to:
        retrieve, by a computing device and for a software application, first log data associated with user activity in a production environment, the user activity including navigation of one or more user interface components in the production environment by a user;
        generate, by the computing device and based on the first log data, a production navigational graph for the software application, wherein a node of the production navigational graph represents a user interface component, of the one or more user interface components, visited by the user during the user activity, and an edge between two nodes represents a navigational link traversed by the user during the user activity;
        retrieve, by the computing device and for the software application, second log data associated with release notes for a next-release version of the software application;
        identify, by the computing device and based on the second log data, a change in a portion of a software code in the next-release version;
        identify, by the computing device and based on the production navigational graph, one or more of: a user interface component, of the one or more user interface components, potentially impacted by the change, and a link potentially impacted by the change; and
        provide, via an interactive graphical user interface, the production navigational graph, wherein the one or more of the user interface component, of the one or more user interface components, potentially impacted by the change and the link potentially impacted by the change are visually highlighted.

2. The computing platform of claim 1, wherein the instructions comprise additional computer-readable instructions that, when executed by the at least one processor, cause the computing platform to:
    determine that the user interface component of the one or more user interface components, or the link potentially impacted by the change has been subsequently tested; and
    cause the interactive graphical user interface to stop the visual highlighting of the user interface component or the link.

3. The computing platform of claim 1, wherein the instructions comprise additional computer-readable instructions that, when executed by the at least one processor, cause the computing platform to:
    receive, via the interactive graphical user interface, an indication of a selection of a selectable visual object associated with a link; and
    display, via the interactive graphical user interface, a message from a service call associated with the link.

4. The computing platform of claim 1, wherein the instructions comprise additional computer-readable instructions that, when executed by the at least one processor, cause the computing platform to:
    receive, via the interactive graphical user interface, an indication of a selection of a selectable visual object associated with a link; and
    display, for a user and a session and via the interactive graphical user interface, a session activity graph indicating user activity during the session.

5. The computing platform of claim 1, wherein the instructions comprise additional computer-readable instructions that, when executed by the at least one processor, cause the computing platform to:
    receive, via the interactive graphical user interface, an indication of a selection of a selectable visual object associated with a node or a link; and
    display, via the interactive graphical user interface, a portion of the code associated with the node or the link.

6. The computing platform of claim 1, wherein the instructions comprise additional computer-readable instructions that, when executed by the at least one processor, cause the computing platform to:
    determine, by the computing device, a coverage score indicative of a percentage of nodes and links in the production navigational graph that have been tested in a testing environment; and
    display, via the interactive graphical user interface, the coverage score.

7. The computing platform of claim 6, wherein the instructions comprise additional computer-readable instructions that, when executed by the at least one processor, cause the computing platform to:
    determine whether the coverage score is above a threshold percentage; and
    cause the interactive graphical user interface to stop the visual highlighting of the one or more of the user interface component, of the one or more user interface components, potentially impacted by the change and the link potentially impacted by the change.

8. The computing platform of claim 1, wherein the instructions comprise additional computer-readable instructions that, when executed by the at least one processor, cause the computing platform to:
    identify a user interface component, of the one or more user interface components, potentially impacted by the change; and determine, for the identified user interface component, of the one or more user interface components, a node visit score indicative of a number of times the identified user interface component is visited in the production environment, wherein the visual highlighting of the identified user interface component is based on the node visit score.

9. The computing platform of claim 1, wherein the instructions comprise additional computer-readable instructions that, when executed by the at least one processor, cause the computing platform to:

identify a link potentially impacted by the change;

determine, for the identified link, a link visit score indicative of a number of times the identified link is traversed in the production environment; and wherein the visual highlighting of the identified link is based on the link visit score.

10. The computing platform of claim 1, wherein the instructions comprise additional computer-readable instructions that, when executed by the at least one processor, cause the computing platform to:

train a machine learning model to predict the one or more of the user interface component, of the one or more user interface components, potentially impacted by the change and the link potentially impacted by the change.

11. The computing platform of claim 10, wherein the instructions comprise additional computer-readable instructions that, when executed by the at least one processor, cause the computing platform to:

retrieve, from a repository, historical data associated with changes in portions of the software code, and impacts to nodes and links, and wherein the training of the machine learning model is based on the historical data.

12. The computing platform of claim 1, wherein the production navigational graph is based on one or more of: a type of service, a type of user, a type of computing environment, and a type of computing device.

13. The computing platform of claim 10, wherein the instructions comprise additional computer-readable instructions that, when executed by the at least one processor, cause the computing platform to:

parse, based on natural language processing, the first log data and the second log data.

14. A method, comprising:

at a computing platform comprising at least one processor, and memory:

retrieving, by a computing device and for a software application, first log data associated with user activity in a production environment, the user activity including navigation of one or more user interface components in the production environment by a user;

parsing, based on natural language processing, the first log data;

generating, by the computing device and based on the parsing of the first log data, a production navigational graph for the software application, wherein a node of the production navigational graph represents a user interface component, of the one or more user interface components, visited by the user during the user activity, and an edge between two nodes represents a navigational link traversed by the user during the user activity;

retrieving, by the computing device and for the software application, second log data associated with release notes for a next-release version of the software application;

parsing, based on the natural language processing, the second log data;

identifying, by the computing device and based on the parsing of the second log data, a change in a portion of a software code in the next-release version;

identifying, by the computing device and based on the production navigational graph, one or more of: a user interface component, of the one or more user interface components, potentially impacted by the change, and a link potentially impacted by the change; and providing, via an interactive graphical user interface, the production navigational graph, wherein the one or more of the user interface component, of the one or more user interface components, potentially impacted by the change and the link potentially impacted by the change are visually highlighted.

15. The method of claim 14, further comprising:

determining that the user interface component, of the one or more user interface components, or the link potentially impacted by the change has been subsequently tested; and causing the interactive graphical user interface to stop the visual highlighting of the user interface component, of the one or more user interface components, or the link.

16. The method of claim 14, further comprising:

training a machine learning model to predict the one or more of the user interface component, of the one or more user interface components, potentially impacted by the change and the link potentially impacted by the change.

17. The method of claim 14, further comprising:

determining, by the computing device, a coverage score indicative of a percentage of nodes and links in the production navigational graph that have been tested in a testing environment; and displaying, via the interactive graphical user interface, the coverage score.

18. The method of claim 14, further comprising:

identifying a user interface component, of the one or more user interface components, potentially impacted by the change;

determining, for the identified user interface component, a node visit score indicative of a number of times the identified user interface component is visited in the production environment; and wherein the visual highlighting of the identified user interface component is based on the node visit score.

19. The method of claim 14, further comprising:

identifying a link potentially impacted by the change;

determining, for the identified link, a link visit score indicative of a number of times the identified link is traversed in the production environment; and wherein the visual highlighting of the identified link is based on the link visit score.

20. One or more non-transitory computer-readable media storing instructions that, when executed by a computing platform comprising at least one processor, and memory, cause the computing platform to:

retrieve, in real-time and by a computing device and for a software application, first log data associated with user activity in a production environment, the user activity including user navigation of one or more user interface components in the production environment by a user;

generate, in real-time and by the computing device and based on the first log data, a production navigational graph for the software application, wherein a node of the production navigational graph represents a user interface component, of the one or more user interface components, visited by the user during the user activity, and an edge between two nodes represents a navigational link traversed by the user during the user activity;

retrieve, by the computing device and for the software application, second log data associated with release notes for a next-release version of the software application;

identify, by the computing device and based on the second log data, a change in a portion of a software code in the next-release version;

identify, based on a machine learning model and based on the production navigational graph, one or more of: a user interface component, of the one or more user interface components, potentially impacted by the change, and a link potentially impacted by the change; and provide, via an interactive graphical user interface, the production navigational graph, wherein the one or more of the user interface component, of the one or more user interface components, potentially impacted by the change and the link potentially impacted by the change are visually highlighted.

* * * * *